(12) United States Patent
Choi et al.

(10) Patent No.: US 11,169,385 B2
(45) Date of Patent: Nov. 9, 2021

(54) LASER OPTICAL DEVICE AND HEAD

(71) Applicants: Laservall Asia Co., Ltd., Hong Kong (CN); Byoung-Chan Choi, Gwangmyeong-si (KR)

(72) Inventors: Byoung-Chan Choi, Gwangmyeong-si (KR); Ki-Seok Kang, Sokcho-si (KR)

(73) Assignees: Laservall Asia Co., Ltd., Yuen Long (CN); Byoung-Chan Choi, Gwangmyeong-si (KR)

( * ) Notice: Subject to any disclaimer, the term of this patent is extended or adjusted under 35 U.S.C. 154(b) by 617 days.

(21) Appl. No.: 16/069,263

(22) PCT Filed: Feb. 29, 2016

(86) PCT No.: PCT/KR2016/002004
§ 371 (c)(1),
(2) Date: Jul. 11, 2018

(87) PCT Pub. No.: WO2017/122865
PCT Pub. Date: Jul. 20, 2017

(65) Prior Publication Data
US 2019/0018252 A1 Jan. 17, 2019

(30) Foreign Application Priority Data
Jan. 13, 2016 (KR) .......................... 10-2016-0003982

(51) Int. Cl.
*G02B 27/30* (2006.01)
*G02B 27/09* (2006.01)
(Continued)

(52) U.S. Cl.
CPC ........... *G02B 27/0927* (2013.01); *G02B 6/02* (2013.01); *G02B 6/4202* (2013.01);
(Continued)

(58) Field of Classification Search
CPC .. G02B 27/30; G02B 27/0927; G02B 19/052; G02B 27/0966; G02B 27/0994;
(Continued)

(56) References Cited

U.S. PATENT DOCUMENTS 6,487,022 B1    11/2002  Okorogu
6,879,448 B2 *   4/2005  Hoffnagle .......... G02B 27/0927
                                                         359/754

(Continued)

FOREIGN PATENT DOCUMENTS

JP    2015-141371 A     8/2015
KR    10-0295170 B1     9/2001
(Continued)

OTHER PUBLICATIONS

International Search Report for PCT/KR2016/002004 dated Sep. 26, 2016 from Korean Intellectual Property Office.

*Primary Examiner* — Alicia M Harrington
(74) *Attorney, Agent, or Firm* — Paratus Law Group, PLLC

(57) ABSTRACT

A laser optical device includes: an optical fiber unit for transmitting a laser beam; a connector for connecting the optical fiber unit; a collimator for transforming the laser beam into a parallel beam; and a condenser lens unit for condensing the parallel beam. The parallel beam emitted from the condenser lens unit is a flat-top beam. A laser optical head includes: a housing; a connector located in the housing and for connecting an optical fiber unit; a collimator formed at one side of the connector located in the housing and for transforming a laser beam transmitted from the optical fiber unit into a parallel beam; and a condenser lens unit located in the housing and for condensing the parallel beam. The parallel beam emitted from the condenser lens unit is a flat-top beam.

8 Claims, 3 Drawing Sheets

(51) Int. Cl.
  *G02B 6/02* (2006.01)
  *G02B 6/42* (2006.01)
  *G02B 6/26* (2006.01)
(52) U.S. Cl.
  CPC ....... *G02B 6/4219* (2013.01); *G02B 27/0966* (2013.01); *G02B 27/30* (2013.01); *G02B 6/262* (2013.01)
(58) Field of Classification Search
  CPC ....... G02B 6/262; G02B 6/4202; H01S 3/005; F21V 13/04
  See application file for complete search history.

(56) References Cited

U.S. PATENT DOCUMENTS

2010/0208356 A1     8/2010   Cayer
2012/0320561 A1*   12/2012   Nozaki .............. G02B 27/0994
                                                     362/19
2016/0368089 A1*   12/2016   Grapov ................ B23K 26/242

FOREIGN PATENT DOCUMENTS

KR           10-0669080 B1    1/2007
WO     WO 2012/071050 A1    5/2012
WO     WO 2014/152867 A1    9/2014

\* cited by examiner

[FIG. 1]
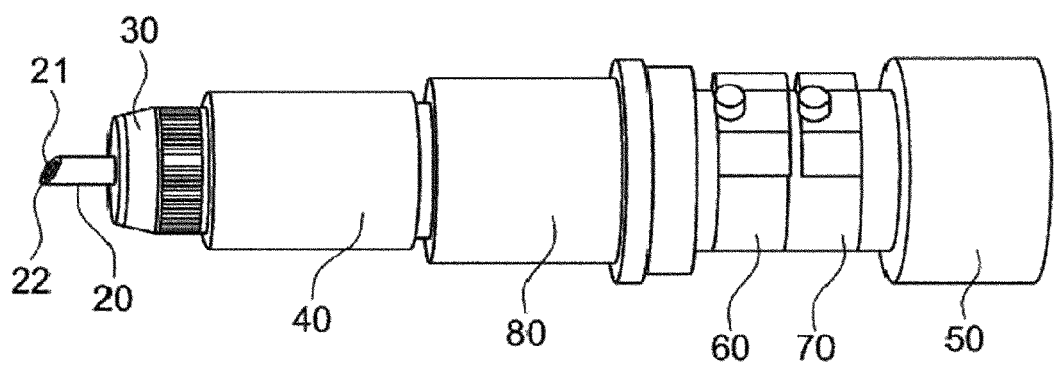
[FIG 2]
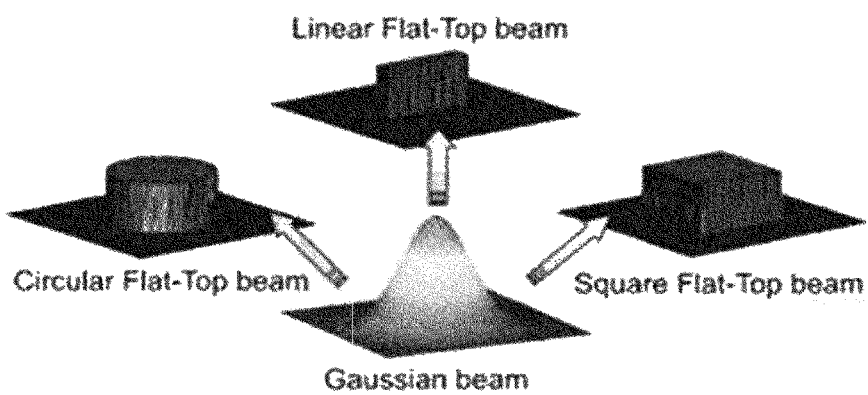

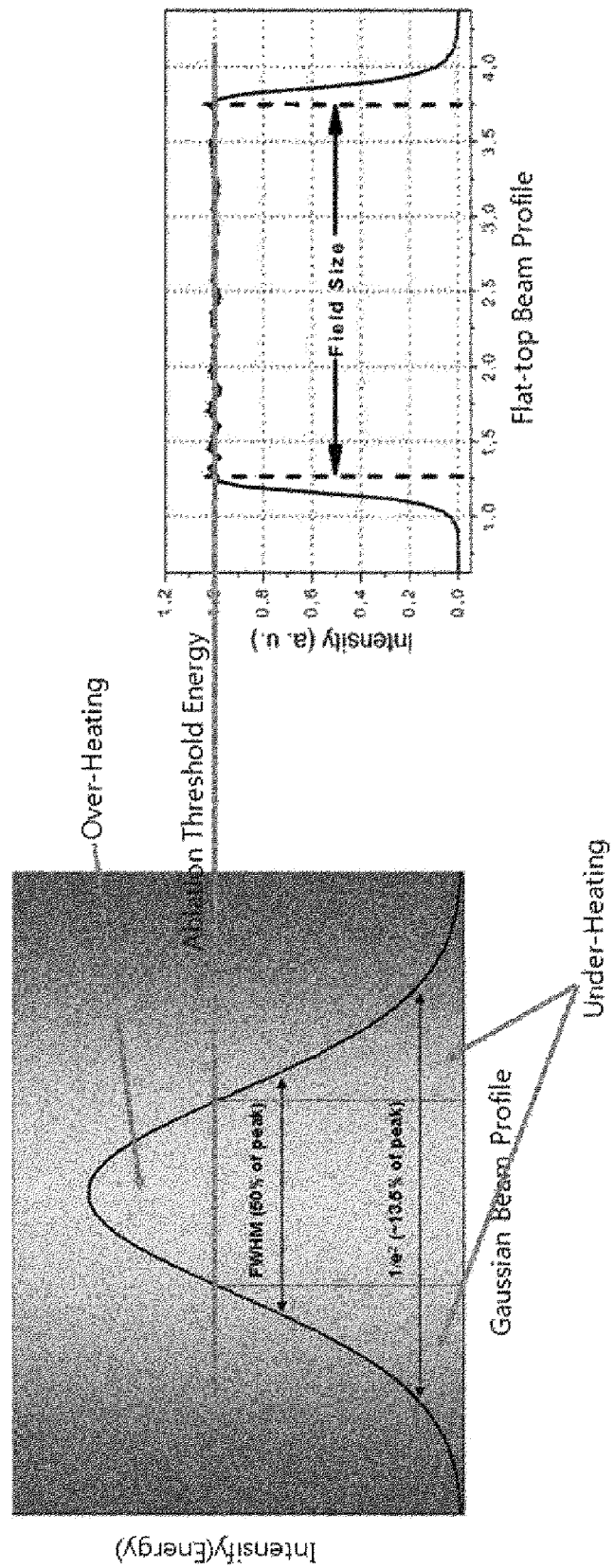
[FIG. 3]

[FIG. 4]
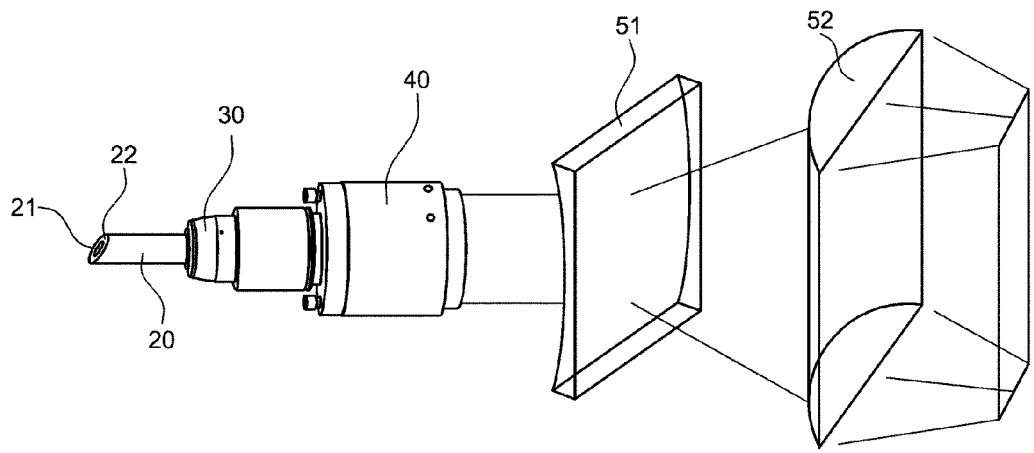
[FIG. 5]
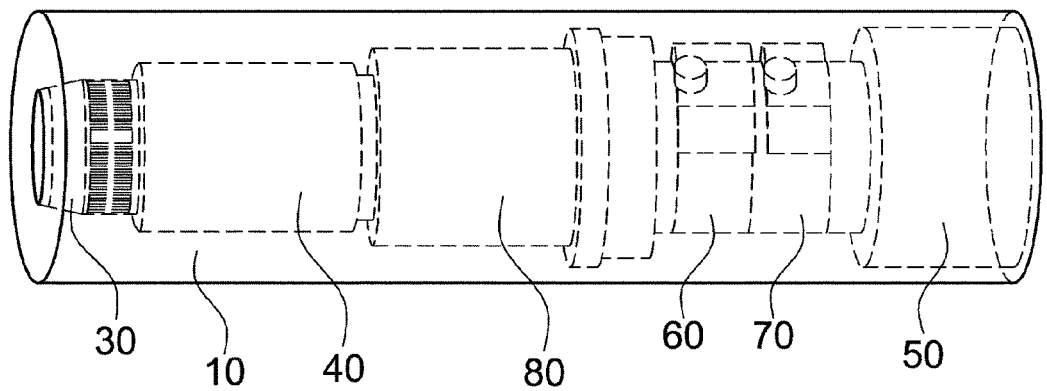
[FIG. 6]
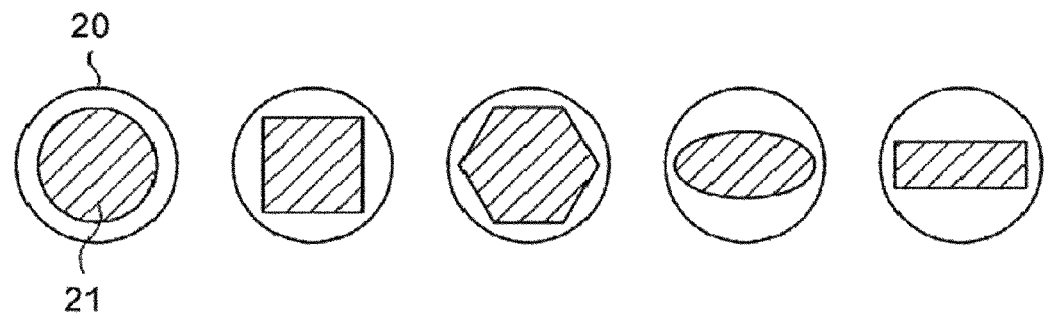

LASER OPTICAL DEVICE AND HEAD

CROSS REFERENCE TO PRIOR APPLICATIONS

This application is a National Stage Patent Application of PCT International Patent Application No. PCT/KR2016/002004 (filed on Feb. 29, 2016) under 35 U.S.C. § 371, which claims priority to Korean Patent Application No. 10-2016-0003982 (filed on Jan. 13, 2016), which are all hereby incorporated by reference in their entirety.

TECHNICAL FIELD

An embodiment of the present disclosure relates to a laser optical head, and more particularly, to a laser optical head, which is smaller in size than the conventional laser optical head, and can adjust the shape and size of a laser beam.

BACKGROUND ART

The conventional technique using a laser uses a Gaussian beam profile that is an inherent characteristic of a general laser.

The Gaussian beam profile is often used in complex optical systems, and when laser energy to be irradiated is smaller than an ablation threshold energy of the object, the inside of the object is under-heated and laser processing is not performed. In addition, when the laser energy to be irradiated is greater than the ablation threshold energy of the object, there has been a problem in that the inside of the object is over-heated to induce ionization, coulomb repulsion, and ablation, resulting in damaging the object. In addition, since the ablation threshold energy of each material is different in the object composed of several layers of various materials, in the Gaussian beam profile, there is a difference in energy between the central part thereof and the outer part thereof, such that there has been a problem in that the central part thereof is overheated, resulting in damaging a part of the central part thereof. Accordingly, although efforts have been made to search for a suitable laser process by converting the characteristics of the Gaussian beam profile using various filters and optical components, there has been a disadvantage in that an optical system must be constructed in a large space.

RELATED ART DOCUMENT

Patent Document (Patent Document 1) Korean Patent No. 10-0295170 (Apr. 25, 2001)

DISCLOSURE

Technical Problem

The present disclosure is intended to solve the above problems, and an object of the present disclosure is to provide a laser optical device and head that can be downsized to be easily applied to any laser equipment.

In addition, an object of the present disclosure is to provide a laser optical device and head for irradiating the laser beam with a uniform energy distribution to an object using a flat-top beam.

In addition, there is an advantage in that it is possible for the user to arbitrarily adjust the shape of the laser beam by applying various optical components to the inside thereof.

In addition, a laser optical device and head is provided that each of the applied optical components can adjust and correct the traveling direction of the laser beam.

Technical Solution

According to an embodiment of the present disclosure, in a laser optical device and head, the laser optical device is provided that includes an optical fiber unit for transmitting a laser beam, a connector for connecting the optical fiber unit, a collimator for transforming the laser beam into a parallel beam, and a condenser lens unit for condensing the parallel beam; and the parallel beam emitted from the condenser lens unit is a flat-top beam.

The optical fiber unit can include a core portion and a covering portion surrounding the core portion.

The core portion can have a polygonal shape.

The core portion can have a square shape.

The laser optical device can further include a beam conversion unit for converting the shape of the parallel beam and energy distribution.

The laser optical device can further include a beam expansion unit that can change the size of the parallel beam.

The laser optical device can include a spatial filter that can change the shape of the parallel beam.

According to another embodiment of the present disclosure, a laser optical head is provided that includes a housing, a connector located in the housing and for connecting an optical fiber unit, a collimator formed at one side of the connector located in the housing and for transforming a laser beam transmitted from the optical fiber unit into a parallel beam, and a condenser lens unit located in the housing and for condensing the parallel beam; and the parallel beam emitted from the condenser lens unit is a flat-top beam.

The housing can include a beam conversion unit for converting the shape of the parallel beam and energy distribution.

The laser optical device can further include a beam expansion unit that can change the size of the parallel beam.

The housing can include a spatial filter that can change the shape of the beam.

Advantageous Effects

The present disclosure can obtain the following effects in accordance with the above-described embodiment, and configuration, connection, and use relationship that will be described below.

According to the embodiments of the present disclosure, there is an advantage in that it is possible to downsize the laser optical device and head, thus easily applying them to any laser equipment.

In addition, there is an advantage in that it is possible to irradiate the laser beam with uniform energy distribution to the object using the flat-top beam.

In addition, there is an advantage in that it is possible for the user to arbitrarily adjust the shape of the laser beam by applying various optical components to the inside thereof.

In addition, there is an advantage in that each of the applied optical components can adjust and correct the traveling direction of the laser beam.

DESCRIPTION OF DRAWINGS

FIG. 1 is a diagram illustrating a laser optical device in accordance with an embodiment of the present disclosure.

FIG. 2 is a diagram illustrating a flat-top beam in accordance with an embodiment of the present disclosure.

FIG. 3 is a diagram illustrating the irradiation intensity of the flat-top beam in accordance with an embodiment of the present disclosure.

FIG. 4 is a diagram illustrating a laser optical device in accordance with an embodiment of the present disclosure.

FIG. 5 is a diagram illustrating a laser optical head in accordance with another embodiment of the present disclosure.

FIG. 6 is a diagram illustrating a core portion in accordance with another embodiment of the present disclosure.

BEST MODE

Hereinafter, specific embodiments of the present disclosure will be described with reference to the drawings. However, this is an exemplary embodiment only and the present disclosure is not limited thereto.

In the following description of the present disclosure, a specific description of known technology related to the present disclosure will be omitted when it can obscure the subject matter of the present disclosure. In addition, the following terms are defined considering the function of the present disclosure, and can be changed depending upon the intention or custom, etc. of the user, the operator, etc. Accordingly, the definition thereof should be based on the contents throughout this specification.

The technical spirit of the present disclosure is determined by the claims, and the following embodiments are merely means for efficiently describing the technical spirit of the present disclosure to those skilled in the art to which the present disclosure pertains.

FIG. 1 is a diagram illustrating a laser optical device 100 in accordance with an embodiment of the present disclosure.

Referring to FIG. 1, a laser optical device 100 can include an optical fiber unit 20, a connector 30, a collimator 40, and a condenser lens unit 50.

Herein, in addition, a beam conversion unit 60, a spatial filter 70, and a beam expansion unit 80 can be further included therein.

The optical fiber unit 20 transmits a laser beam to a laser optical head 200.

The connector 30 connects the laser optical head 200 and the optical fiber unit 20 to be coupled to each other, and the connector 30 can induce the laser beam delivered from the optical fiber unit 20 to the inside of the laser optical device 100. For this purpose, one side of the connector 30 is connected to the optical fiber unit 20, and the other side thereof is inserted into the laser optical head 200. In addition, the connector 30 can be located close to the collimator 40.

The collimator 40 can transform the laser beam emitted from the laser into a parallel beam and transmit it in a parallel state.

The condenser lens unit 50 can be located at the outermost one side of the laser optical device 100 to condense the laser beam.

The laser optical device 100 can be composed of the optical fiber unit 20, the connector 30, the collimator 40, and the condenser lens unit 50. However, it can include additional optical units. For example, it can further include the beam conversion unit 60, the spatial filter 70, and the beam expansion unit 80.

The beam conversion unit 60 can be a unit for converting the energy distribution of the parallel beam received from the collimator 40. The beam conversion unit 60 can be a unit for converting the shape of the Gaussian beam profile of the laser beam into the shape of a flat-top beam having uniform energy distribution.

When a core portion 21 of the optical fiber unit 20 uses the circular core portion 21, the flat-top beam can be produced by mounting the beam conversion unit 60.

However, when the square core portion 21 is used, the flat-top beam can be directly generated in the square core portion 21, such that the flat-top beam can be generated without mounting the beam conversion unit 60. It is not necessary to mount the beam conversion unit 60, such that the optical path is shortened and the size of the laser optical device 100 can be reduced.

The beam conversion unit 60 can be produced using a simple aperture masking, a 1D beam shaping with adjustable phase slit, refractive optical systems with at least two aspheric elements, a single bi-aspheric element, reflective optical systems, binary diffractive optics, etc.

The spatial filter 70 can transform the shape of the beam. The shape of the beam emitted from the condenser lens unit 50 can be transformed using a filter such as a slit or a hole.

The beam expansion unit 80 can convert a thin parallel light beam of the laser beam irradiated by the laser beam into a thick parallel light beam and emit it. For example, the beam expansion unit 80 can be composed of at least three lenses. The magnification thereof can be adjusted using the distance of each lens. Adjustment of the lens magnification can include one of a fixed type, a manual adjustment type and an automatic adjustment type. The fixed type has a fixed distance between each lens, and the magnification thereof can be fixed, and in the manual adjustment type, the user can directly adjust the magnification thereof by turning the lens manually. In addition, the automatic adjustment type can automatically adjust the magnification thereof by adjusting the lens distance using a motor. The beam expansion unit 80 can be interposed between the collimator 40 and the beam conversion unit 60, and cannot be located when the laser beam is sufficiently thick. In addition, not only the beam expansion unit 80 but also at least one optical component such as a mask or a slit can be included between the collimator 40 and the beam conversion unit 60.

According to an embodiment of the present disclosure, the optical fiber unit 20 can include a core portion 21 and a covering portion 22 surrounding the core portion 21. The core portion 21 can be formed in various shapes.

The core portion 21 can be formed in various shapes such as a circle, an ellipse, and a square.

The core portion 21 can have a polygonal shape, and particularly have a square shape. When using the square core portion 21, a beam in the form of a flat-top beam can be generated without the beam conversion unit 60. However, when the core portion 21 such as a circular shape is used, the beam conversion unit 60 can be mounted to convert into the shape of a flat-top beam.

FIG. 2 is a diagram illustrating the conventional Gaussian beam profile and a model of a flat-top beam.

Referring to FIG. 2, the energy of the Gaussian beam profile is generated to be increased toward the center thereof, such that the energy distribution cannot be uniform. However, the flat-top beam can uniformly distribute the energy, and laser processing with uniform quality can be performed.

The flat-top beam is generated in the shape such as the cylinder, and the energy distribution can be uniform. Herein, the shape of the beam is not limited to the cylinder, but can be transformed into the shape of a flat-top circle beam, a flat-top square beam, a flat-top line beam, etc. that have uniform energy distribution.

In the conventional Gaussian beam profile, since there has been a difference in laser energy distribution between the central part thereof and the outer part thereof, no-melting, porosity, micro-cracks, etc. have locally occurred in laser selective processing, etc., resulting in reducing the quality. In addition, the central part thereof is over-heated, and multiple laser scanning with lower laser energy or laser scanning having dense intervals has been required for improving laser processing quality.

However, when the laser beam is irradiated by converting into a flat-top beam, the energy of the laser beam can be uniformly irradiated, such that a uniform process can be performed.

FIG. 3 is a graph illustrating the energy intensity of the conventional Gaussian beam profile and a flat-top beam.

Referring to FIG. 3, in the Gaussian beam profile, when the laser energy irradiated is smaller than the ablation threshold energy of the object, the inside of the object is under-heated, and laser processing is not performed. When the laser energy irradiated is greater than the ablation threshold energy of the object, the inside of the object is over-heated to induce ionization, coulomb repulsion, and ablation, resulting in damaging the object.

However, when the beam is converted into the flat-top beam, the laser beam has a uniform energy distribution, such that it is possible to perform laser processing with uniform quality by irradiating appropriate laser energy with processing critical energy of the material.

FIG. 4 is a diagram illustrating a laser optical device in accordance with an embodiment of the present disclosure.

Referring to FIG. 4, the optical fiber unit 20 is connected to the connector 30 to irradiate the laser, and can include the core portion 21 and the covering portion 22 surrounding the core portion 21.

When the core portion 21 uses a circular core optical fiber, a square/rectangular core optical fiber, a ring type core optical fiber, etc., the shape of the beam can be formed in a circle, a square, a ring, etc. depending upon the shape of the optical fiber used in the core portion 21.

The laser beam delivered from the optical fiber unit 20 passes through the collimator 40 and is converted the beam into a parallel state to be moved to the beam conversion unit 60.

The condenser lens unit 50 can include a lens. The beam can be converted by a combination of a first lens 51 and a second lens 52. For example, the first lens 51 can be a flat concave cylindrical lens, and the second lens 52 can be a flat convex cylindrical lens. The beam can be converted by a combination of a plurality of lenses.

The first lens 51 and the second lens 52 can be the same kind of lens, or can be different kinds of lenses. In addition, the order arrangement of the first lens 51 and the second lens 52 that are different lens can be changed, and not only the order arrangement thereof but also the direction arrangement of the front surface and rear surface of each lens can be variously mounted.

In addition, by combining the first lens 51 and the second lens 52 to adjust the distance therebetween, it is also possible to adjust a ratio of the horizontal size to the vertical size of the laser beam passing through the condenser lens unit 50. For example, the horizontal size and vertical size of the laser beam can have a ratio of at least 1:10.

FIG. 5 is a diagram illustrating a laser optical head 200 in accordance with another embodiment of the present disclosure. Referring to FIG. 5, the laser optical head 200 can include a housing 10. The connector 30, the collimator 40, and the condenser lens unit 50 can be included in the housing 10.

The connector 30 can be located in the housing 10 to connect the optical fiber unit 20. The collimator 40 is located in the housing 10 and formed on one side of the connector 30 to convert the laser beam transmitted from the optical fiber unit 20 into a parallel beam.

The condenser lens unit 50 can be located in the housing 10 to condense the parallel beam.

The condenser lens unit 50 can include a lens. The size of the beam can be changed by a combination of the first lens 51 and the second lens 52.

In addition, the housing 10 can further include the beam conversion unit 60, the spatial filter 70, and the beam expansion unit 80.

The beam conversion unit 60 can include a lens. The beam can be converted by a combination of the first lens 51 and the second lens 52.

Accordingly, the flat-top beam can be generated without using the beam conversion unit 60 when the optical fiber unit 20 uses the polygonal shape, particularly, the square core portion 21, but conversely, the flat-top beam can be generated using the beam conversion unit 60 when using the circular core portion 21 without using the square core portion 21.

When the square core portion 21 is used, the laser optical head 100 cannot include the beam conversion unit 60, such that the size of the laser optical head 100 can be reduced. When the beam conversion unit 60 is used, the shape of the beam can be transformed by the beam conversion unit 60 to generate a desired shape of the beam, thus improving the laser processing speed and the process quality.

FIG. 6 is a diagram illustrating a core portion 21 in accordance with another embodiment of the present disclosure.

Referring to FIG. 6, an optical fiber type of the optical fiber unit 20 applicable to the present disclosure can be an optical fiber having the core portion 21 having various shapes. Depending on the size of the optical fiber, the size and quality of the beam passing through the optical system of the present technology can be changed.

The core portion 21 can include the core portion 21 such as a circle, a square, a hexagon, an ellipse, a rectangle, etc. in order from left to right.

However, when having the square core portion 21, the laser optical device 100 can irradiate the flat-top beam without including the beam conversion unit 60.

In addition, the optical component applied to the inside thereof can apply any optical component, such that the user can arbitrarily adjust the shape of the laser beam, and each optical component applied can include a unit that can adjust and correct the traveling direction of the laser beam.

The laser optical head 200 in accordance with the embodiments of the present disclosure can be applied to various laser materials processing, such as surface treatment, perforation, welding, cutting, scribing, ablation, cleaning, drilling, marking and printing, etc. in the fields of semiconductor, PCB, display, automobile, heavy industry, bio, and medical.

As described above, while the present disclosure has been described in detail with reference to representative embodiments thereof, those skilled in the art will appreciate that various modifications can be made for the above-described embodiment within the scope of the present disclosure. Accordingly, the scope of the present disclosure should not be limited to the described embodiments, but should be determined by equivalents to the appended claims, as well as the following claims.

DETAILED DESCRIPTION OF MAIN ELEMENTS

100: laser optical device
200: laser optical head
10: housing
20: optical fiber unit
21: core portion
22: covering portion
30: connector
40: collimator
50: condenser lens unit
51: first lens
52: second lens
60: beam conversion unit
70: spatial filter
80: beam expansion unit

The invention claimed is:

1. A laser optical device, comprising:
an optical fiber unit for transmitting a laser beam;
a connector for connecting the optical fiber unit;
a collimator for transforming the laser beam into a parallel beam; and
a condenser lens unit for condensing the parallel beam,
wherein the parallel beam emitted from the condenser lens unit is a flat-top beam,
wherein the optical fiber unit comprises a core portion having a square shape and a covering portion surrounding the core portion,
wherein the condenser lens unit comprises a first lens and a second lens which are arranged in order, wherein the first lens includes a flat concave cylindrical lens which has a concave cylindrical front surface having an axis arranged in a horizontal direction and a flat rear surface, and the second lens includes a flat convex cylindrical lens which includes a convex cylindrical front surface having an axis arranged in a vertical direction and a flat rear surface, and
wherein a distance between the first lens and the second lens is adjusted such that a ratio of a horizontal size to a vertical size of the laser beam passing through the condenser lens unit is 1:10 or more.

2. The laser optical device of claim 1, further comprising a beam conversion unit for converting a shape of the parallel beam and energy distribution.

3. The laser optical device of claim 1, further comprising a beam expansion unit configured to change a size of the parallel beam.

4. The laser optical device of claim 1, further comprising a spatial filter configured to change a shape of the parallel beam.

5. A laser optical head, comprising:
a housing;
a connector located in the housing and for connecting an optical fiber unit;
a collimator formed at one side of the connector located in the housing and for transforming a laser beam transmitted from the optical fiber unit into a parallel beam; and
a condenser lens unit located in the housing and for condensing the parallel beam,
wherein the parallel beam emitted from the condenser lens unit is a flat-top beam,
wherein the optical fiber unit comprises a core portion having a square shape and a covering portion surrounding the core portion,
wherein the condenser lens unit comprises a first lens and a second lens which are arranged in order, wherein the first lens includes a flat concave cylindrical lens which has a concave cylindrical front surface having an axis arranged in a horizontal direction and a flat rear surface, and the second lens includes a flat convex cylindrical lens which includes a convex cylindrical front surface having an axis arranged in a vertical direction and a flat rear surface, and
wherein a distance between the first lens and the second lens is adjusted such that a ratio of a horizontal size to a vertical size of the laser beam passing through the condenser lens unit is 1:10 or more.

6. The laser optical head of claim 5, wherein the housing comprises a beam conversion unit configured to convert a shape of the parallel beam and energy distribution.

7. The laser optical device of claim 5, further comprising a beam expansion unit configured to change a size of the parallel beam.

8. The laser optical head of claim 5, wherein the housing comprises a spatial filter configured to change a shape of the beam.

* * * * *